Patented Mar. 21, 1944

2,344,872

UNITED STATES PATENT OFFICE 2,344,872

PREPARATION OF ETHYL MERCURY SALTS

Lee C. Holt, Wilmington, Del., assignor to E. I. du Pont de Nemours & Company, Wilmington, Del., a corporation of Delaware No Drawing. Application April 6, 1939,
Serial No. 266,420

12 Claims. (Cl. 167—22)

This invention relates to the preparation of ethyl mercury salts and particularly to their preparation in iron equipment.

Engelmann, in Patent 1,783,377 of December 2, 1930, describes the preparation of alkyl mercury salts in the form of dry powders, which salts are primarily intended to be used as disinfectants. The mercury salts employed in such process are corrosive to iron. Accordingly, when it is attempted to prepare such compounds according to the method of Engelmann in iron equipment, the reagents tend to destroy the equipment and become seriously contaminated with iron compounds. Therefore, in the usual process employed in the industry, it has been found necessary to carry out the reaction in tile lined ball mills employing porcelain balls, great care being taken to avoid contacting the reagents with iron. Such mills and balls are extremely expensive to make and to repair. Due to its structure, this equipment is necessarily of small capacity. The time required to make a batch of the desired products employing such equipment varies from about 100 to about 200 hours, and averages about 140 hours. This is largely due to the heat insulating properties of the material of which the equipment is made, so that there is slow heat transfer through the equipment. All of these factors have combined to make the products very expensive.

Kharasch, in Patent 1,987,685, of January 15, 1935, has described a method of making organic mercury salts in polar solvents. By this method of Kharasch, the time necessary for the reaction to take place is greatly decreased. However, the mercury salts are strongly corrosive toward iron in such polar solvents, particularly in the alcohols. If mercuric chloride is added to alcohol in contact with iron, there occurs an immediate and vigorous reaction in which iron replaces mercury and metallic mercury separates out. This reaction is so rapid that the reaction mass turns gray with metallic mercury at once. This results not only in corrosion of the equipment and contamination of the product with iron, but also in the conversion of the expensive mercury salt into metallic mercury which is of no value in the final product, and in great reduction in the yield of the desired product. Accordingly, it was always supposed that this reaction could not be carried out in iron apparatus because such apparatus would be rapidly attacked and destroyed by the reacting materials and the mercury salt would be reduced to ineffective metallic mercury. This method of Kharasch has not been employed to any great extent in commercial practice for these reasons. It is not practical to carry out the process of Kharasch in tile lined equipment for the reason that the alcohol must be removed from the reaction mixture and should be recovered to make the process economical. Because of the slow heat transfer in tile lined equipment and other characteristics of such equipment, it cannot be employed economically as a still for removing and recovering the alcohol or other polar solvent. Furthermore, the reaction is exothermic and, when permitted to take place at a rapid rate as in the process of Kharasch, heat is developed which can not be dissipated through tile lined equipment.

It is an object of the present invention to provide an improved method of preparing ethyl mercury salts in a rapid and economical manner. Another object is to provide a method of preparing such salts in equipment containing iron which is exposed to the reacting materials. A further object is to provide a method of preparing such salts at low temperatures. A still further object is to provide a method for preparing dust disinfectants in iron equipment. Still other objects will appear hereinafter.

These objects may be accomplished in accordance with my invention which comprises first introducing tetraethyl lead and a polar solvent into iron equipment or equipment containing iron which will be exposed to the reagents, and then adding mercury salts to the resulting solution. It was surprising to find that, if all of the tetraethyl lead and solvent required was incorporated in the equipment and the mercury salt was then added, the iron was completely protected. By this method, it was found that the reaction could be made to take place without destroying the mercury salt, corroding the iron or contaminating the product with any substantial amount of iron compounds. Usually, a small excess, up to about 10%, of tetraethyl lead required for reaction is employed.

The mercury salt reacts most readily with the tetraethyl lead in a polar solvent. However, it is not necessary to the operation of my process that all of the tetraethyl lead be in solution when the addition of the mercury salt is commenced, but my process may be and preferably is carried out with insufficient solvent to dissolve all of the tetraethyl lead. Since only small amounts of the solvent can be tolerated in the final product for some purposes, it is economically desirable to keep the amount of solvent at the minimum to avoid expensive distillations. The amount of solvent employed will generally be from about 20% to about 130%, based on the mercury, and preferably from about 20% to about 75% based on the mercury. The larger range given will correspond to about 0.2 to about 1.5 parts of solvent to each part of tetraethyl lead. Preferably, from about 0.5 to about 0.8 part of solvent to each part of tetraethyl lead will be employed. Best results are obtained when about 0.6 part of solvent to 1 part of tetraethyl lead are used.

Any of the usual polar solvents may be employed. It will generally be preferable to employ the low molecular weight volatile solvents such as isopropyl alcohol, ethyl alcohol, methyl alcohol and acetone. Of these, ethyl alcohol and isopropyl alcohol appear to be the most effective and are preferred. Methyl alcohol is less desirable, as it is difficult to cause the reaction to go to completion in this solvent and, generally, lower yields of material are obtained.

In some cases, higher molecular weight solvents may be employed. It is even desirable that some final products, diluted with inert diluent, contain higher alcohols for certain purposes, specifically from about 1 to about 4% of higher alcohol on the final diluted product. Some of the higher alcohols which may be employed are octyl alcohol, dodecyl alcohol, cetyl alcohol, stearyl alcohol, the alcohols obtained by the carboxylic reduction of the higher fatty acids obtained from cottonseed oil and palm oil, and the mixtures of alcohols obtained as a by-product in the synthesis of methanol from carbon monoxide, and particularly that fraction having a boiling range of about 165 to about 230° C. While the higher alcohol may be employed as the sole polar solvent, it is generally preferred to employ it with a low molecular weight polar solvent such as ethyl alcohol. When the higher alcohols are employed alone, the reaction mass tends to become thicker and the granular mass to become quite hard. When the phosphates are made by this method, particles of unreacted mercuric oxide become scattered through the granules and a further period must be allowed for this mercuric oxide to react, and the reaction to go to completion. When a small amount of the low molecular solvent is employed with the higher molecular weight solvents, these objections are overcome. Generally, from about 1 to 1 and ½ parts of the low molecular weight solvent is employed for each part of the higher molecular weight solvent.

Tetraethyl lead is soluble to only a limited extent in many of the polar solvents, and particularly the lower molecular weight solvents. For example, it is only soluble to the extent of about 27% in 95% ethyl alcohol at 28° C. Accordingly, when a polar solvent is employed in which the tetraethyl lead is soluble to a limited extent, only a portion of the tetraethyl lead is dissolved in the solvent when the addition of the mercury salt is commenced. However, the reaction still proceeds smoothly and rapidly as more tetraethyl lead is dissolved in the solvent to replace that which reacts with the mercury salt. The amount of solvent employed will determine to some extent the rate of addition of the mercury salt. The mercury salt will be added at a slower rate with smaller amounts of solvent, the mercury salt being added as rapidly as the tetraethyl lead becomes available for reaction. The amount of solvent employed will also be determined by practical operating conditions, as the reaction product is a solid. Accordingly, for efficient operation, it is frequently desirable to employ sufficient solvent to render the final reaction mass, prior to the removal of solvent, sufficiently fluid to permit efficient agitation and mixing of the ingredients.

This process is applicable to the preparation of alkyl mercury salts generally, but is particularly of value in preparing the ethyl mercury salts of the inorganic acids such as ethyl mercury chloride, ethyl mercury phosphate and ethyl mercury sulfate.

While this process is of advantage for use in equipment in which only parts, such as the agitator, are made of iron, it is particularly adapted for operations in iron pots or vessels employing iron agitators. Such iron vessels are relatively cheap to manufacture, can be made of large capacity, and may be provided with external cooling means such as jackets and the like. Such vessels, being good conductors of heat, provide for ready heat transfer whereby the reaction can be caused to take place at a rapid rate, and the heat formed dissipated by cooling the vessels by any of the usual cooling fluids such as air, water, oils, liquids absorbing heat by their latent heat of vaporization and the like. In this way the reaction may be controlled and caused to take place at relatively low temperatures. Also, such equipment is readily adapted for use as stills, so that the solvent may be removed from the reaction mixture by distillation.

In general, the solvent, such as ethyl alcohol, is introduced into an iron vessel and the tetraethyl lead then introduced and dissolved in the solvent. The mercury salt is then added to the solution at such a rate as to avoid raising the temperature of the reaction mixture above 40° C. By employing external cooling means, this temperature can be maintained with a comparatively rapid addition of the mercury salt. When the reaction is complete, it is possible to distill off any excess alcohol or other solvent by vacuum distillation, thereby obtaining the pure ethyl mercury salt.

When ethyl mercury phosphate and the like is made from mercuric oxide and the acid, the mercuric oxide may be added with the solvent or the tetraethyl lead or prior to either thereof. The acid is added to the solution of tetraethyl lead in the solvent. Under these conditions, the acid reacts with the mercuric oxide to form the mercury salt in situ. It will be understood that this procedure comprises introducing the mercury salt into the solution as such phrase is used herein and in the appended claims. It is only essential in accordance with my invention to produce a solution of the tetraethyl lead in the solvent and then introduce the mercury salt into such solution. Otherwise, the order of mixing the various ingredients may be varied as desired. It is not even necessary to dissolve the tetraethyl lead in all of the solvent, but a part of the solvent may be introduced together with the mercury salt or the acid.

While the pure ethyl mercury salt may be produced as has been described above, it will generally be preferable to add an inert solid diluent to the reaction mixture at least as soon as the reaction mass begins to become pasty, and preferably to add the inert diluent with the rest of the ingredients so that the reaction between the mercury salt and the tetraethyl lead will take place in the presence of about 0.2 to about 3 parts of the solid inert diluent to each part of the total of the other ingredients of the reaction mixture. The inert diluent may be added after the reaction is complete, but prior to the removal of the solvent. When it is attempted to remove excess solvent by distillation in the absence of the diluent, the reaction mass becomes pasty before all of the solvent is removed. It is difficult to remove the rest of the solvent from such a pasty mass. The addition of the solid diluent to the reaction mass, at least as soon as the reaction mass begins to become pasty, aids in breaking up the reaction mass as it dries and greatly facilitates the removal of the solvent.

It is most desirable to add the inert diluent with the other ingredients, as the diluent then acts as a distributing agent for the mercury salts, aiding in causing the reaction to go to completion in a minimum length of time. Also, since an inert diluent is required in many of the commercial applications of the products of my invention, the addition of the inert diluent at such time provides a convenient method for making such commercial products.

Any of the usual inert diluents, such as talc, sodium sulfate, soda ash, borax, cornstarch, magnesium oxide, sodium acid phosphate, and the like, may be employed. The particular diluent or mixture of diluents employed will be largely determined by the final product desired, and the use for which it is intended. Thus, a concentrated mixture of ethyl mercury phosphate and talc may be highly diluted with cornstarch, magnesium oxide and sodium acid phosphate to make one type of product widely used as a seed disinfectant. Another type of product, which is widely used as a seed disinfectant, may be made by employing talc as the sole inert diluent. Further, if desired, the ethyl mercury salt may be made in the presence of any of such diluents, and particularly talc, and then separated therefrom as a pure product by solvent extraction or other suitable means.

In order to illustrate my invention more clearly, the preferred modes of carrying the same into effect, and the advantageous results to be obtained thereby, the following examples are given:

Example I

Into a three necked glass flask equipped with a heavy iron stirrer was charged 50 parts of 95% ethyl alcohol and 35.9 parts of tetraethyl lead. With the agitator running, 54.5 parts of mercuric chloride was added during three minutes. The temperature was kept below 40° C. by external cooling. A test, made after 45 minutes of agitation, showed that the mercuric chloride had all been consumed. 202 parts of anhydrous sodium sulfate and 200 parts of soda ash were then added and the alcohol removed by vacuum distillation. 42 parts of alcohol was recovered. 250 parts more of soda ash was then added and the mass well stirred. After removing from the flask, a sample was analyzed for iron. The iron content was only 0.013% which was only slightly higher than the iron content of the materials used.

Example II

Into an iron pot, equipped with an iron agitator, was charged 75 parts of 95% ethyl alcohol and 71.8 parts of tetraethyl lead. With the agitator running, 109 parts of mercuric chloride was charged in during five minutes. The temperature was kept at 40° C. and, after one-half hour, the reaction was shown to be complete. 100 parts of anhydrous sodium sulfate and 100 parts of soda ash were added and the alcohol removed by vacuum distillation. 65 parts of alcohol was recovered. The final product contained 21.7% of mercury and only 0.05% of iron.

Example III

Into an iron graining bowl, equipped with an iron plow agitator, was charged 54 lbs. of 95% ethyl alcohol and 67 lbs. of tetraethyl lead. 101 pounds of mercuric chloride was added rapidly with the agitator running. 66 pounds of soda ash was then added. The temperature was kept at about 40° C. After two hours of stirring, the alcohol was distilled off in a vacuum. The dry charge was removed from the graining bowl and mixed in a porcelain ball mill with sufficient anhydrous sodium sulfate and soda ash to produce a final product having a mercury content of 5.07%, which is the required amount for a commercial product. The iron content of the final product was 0.01%.

Example IV

Into the same iron pot used for Example II was charged 120 parts of 95% ethyl alcohol, 100 parts of talc, 124.4 parts of mercuric oxide and 102 parts of tetraethyl lead. With the agitator running, 68 parts of 85% phosphoric acid was charged in during 10 minutes. The temperature was kept at or below 40° C. Agitation was continued during 1.5 hours when a test showed the reaction to be complete. 100 parts of dry talc was added and the alcohol was removed by vacuum distillation. The final dry product contained 27.7% mercury and 1.32% of iron. The talc used contained 4.34% iron so the iron content of the final product was no more than that contained in the materials used.

The phosphoric acid, as it is added, reacts with the mercuric oxide to form the mercuric salt. This is equivalent to adding mercuric phosphate to the reaction mass.

Example V

Into an agitated graining bowl, with close scraping agitator blades, is charged 432 lbs. of mercuric oxide and 450 lbs. of talc. These are mixed and there is then run in 356 lbs. of lead tetraethyl and 75 lbs. of a mixture of higher aliphatic alcohols obtained as a by-product in the synthesis of methanol from carbon monoxide, which mixture of alcohols has a boiling range of 165° C. to 230° C. These ingredients are well mixed and cooled preferably to about 10° C. A solution of 214 lbs. of 85% phosphoric acid in 112 lbs. of ethyl alcohol is added gradually to the mass in the graining bowl, the rate of addition being such that the temperature is kept below 30° C. The mercuric oxide reacts rapidly with the phosphoric acid and lead tetraethyl to form ethyl mercury mono acid phosphate. The mass thickens as the phosphoric acid is added until it breaks up into a pasty granular mass. The reaction is over very soon after all the phosphoric acid has been added. As soon as the mercuric oxide has all disappeared, 1050 lbs. of talc is added to the graining bowl. The contents are well mixed and then discharged through a mill, to break up the lumps, into a mixer into which sufficient borax has been run to make the total charge 7500 lbs. After mixing, the mass will have close to 5% of mercury and is ready for packaging and shipment. One percent of higher alcohols is required in some final products so these are used as a part of the alcohol to aid in the reaction. In addition 1½% of ethyl alcohol based on the final product is used.

The higher alcohols are not necessary as the reaction goes perfectly well when 2½% of either ethyl alcohol or isopropyl alcohol on the weight of the final product is used. Also other higher alcohols than those specifically given can be used. The reaction has been carried out with 1% of octyl alcohol and 1½% of ethyl alcohol on the basis of the final product.

The reaction has also been carried out with 1% of the higher alcohols only. In this case, the mass becomes thicker and the granular mass, formed when the phosphoric acid has all been added, will be quite hard. Particles of unreacted mercuric oxide are scattered through the granules. The second addition of talc is made before all of the mercuric oxide has disappeared. The mass breaks up after this and, on standing several hours, the last traces of mercuric oxide react. While this method of procedure would save the cost of the small amount of ethyl alcohol used in the process, the saving is not sufficient to warrant the increased time necessary to complete the reaction. There is also the possibility that the granular chunks might be larger and that, therefore, the reaction might not go to completion.

The procedure described in this example has several distinct advantages over those given in the prior examples. The time cycle is greatly reduced due to elimination of the alcohol distillation, the loss of mercury is reduced due to elimination of the heating and distillation incident to removing the alcohol, and the cost is reduced due to cutting down the alcohol consumption.

Example VI 81 grams of mercuric oxide and 81 grams of talc were stirred together in a flask equipped with an iron agitator fitting closely against the walls. 67 grams of lead tetraethyl was then added, followed by 15 grams of a mixture of higher alcohols obtained as a by-product in the methanol synthesis from carbon monoxide and having a boiling range of 165° to 230° C. 40 grams of 85% phosphoric acid was then dropped in while the temperature of the reaction mass was kept below 20° C. The reaction began at once and as the phosphoric acid was added the mass gradually became thicker and finally broke up into a granular product. The mass was stirred in this state for two hours. It was still slightly yellow with unreacted mercuric oxide. 220 grams more of talc was added and stirring was continued. The lumps in the product largely broke up and after a few hours of stirring the reaction was complete. The material was then poured out into a ball mill and sufficient borax was added to bring the weight to 1500 grams. This was ground to form a commercial product which contains about 5% of mercury and is used for the prevention of fungus growth on lumber.

Example VII 81 grams of mercuric oxide and 81 grams of talc were mixed in an agitated flask. 67 grams of lead tetraethyl was run in. The temperature of the mass was cooled below 20° C. and a mixture of 40 grams of 85% phosphoric acid and 40 grams of isopropyl alcohol was slowly dropped in. In about one hour, the color of mercuric oxide had disappeared. 220 grams of talc was then added, thoroughly mixed with the product and the resulting material discharged into a ball mill with sufficient borax to make 1500 grams. The final ground product analyzed 4.70% of mercury which accounts for 94.1% of the original mercury used.

The addition of the 220 grams of talc above is not an essential, but it is very convenient in the making of a product for use on lumber, because the final formula calls for the presence of this much talc. Any dry inert which is used to dilute the ethyl mercury phosphate to a commercial concentration can be added.

Example VIII 81 grams of mercuric oxide, 81 grams of talc and 67 grams of lead tetraethyl were mixed and 15 grams of octyl alcohol added. A mixture of 40 grams of 85% phosphoric acid with 25 grams of denatured ethyl alcohol was then dropped in while the temperature was kept below 20° C. The reaction progressed smoothly and the mercuric oxide was rapidly converted to ethyl mercury acid phosphate. After about 1½ hours, 220 grams of talc was added and the mass stirred about one hour more. The reaction mass was ground in a ball mill with sufficient borax to make the entire amount 1500 grams. The final product contained 4.72% mercury which accounts for 94.7% of the mercury charged.

Example IX

The following experiment was run to illustrate the preparation of ethyl mercury acid phosphate starting from previously prepared mercuric phosphate. 100 grams of mercuric phosphate, 65 grams of lead tetraethyl and 200 grams of talc were stirred together in a flask with an iron agitator which scraped the sides of the flask. No reaction took place as no heat was evolved and there was no change in physical state. 15 grams of 85% phosphoric acid dissolved in 40 grams of denatured ethyl alcohol was then dropped in to dissolve part of the tetraethyl lead, convert the inactive neutral mercuric phosphate to the active acid-phosphate which dissolves in the alcoholic solution and reacts with the tetraethyl lead. Before all of the phosphoric acid-alcohol mixture had been added, a reaction started as shown by an evolution of heat. The mass was a sticky paste at first but, as the tetraethyl lead was consumed, it began to dry up and finally became granular. After about 8 hours of stirring, all of the mercury had been converted to ethyl mercury acid phosphate as shown by mixing a sample of the powder with caustic soda solution. No yellow mercuric oxide was formed, showing the absence of mercuric phosphate. Such a concentrated product can be diluted with any desired inert material to form a commercial product.

Example X 81 grams of talc, 15 grams of alcohols, obtained as a by-product in the synthesis of methanol from carbon monoxide and having a boiling range of 165 to 230° C., and 25 grams of denatured ethyl alcohol were mixed in an agitated flask. 67 grams of lead tetraethyl were added all at once. The mass was held at about 30° to 35° C., and 101.5 grams of mercuric chloride was gradually added. The reaction started at once with considerable evolution of heat. The mass was stirred until lumps of mercuric chloride, which formed as it was charged, were well broken up. This took about 2 hours. 220 grams of talc were then added to the pasty mass. The material broke up into small granules and powder. This is a concentrated mixture of ethyl mercury chloride and talc, and may be diluted in any desired way to form a commercial product.

Example XI 15 grams of alcohols, obtained as a by-product in the synthesis of methanol from carbon monoxide and having a boiling range of 165° to 230° C., and 25 grams of denatured ethyl alcohol were mixed in an agitated flask. 67 grams of lead tetraethyl was then added. 101.5 grams of mercuric chloride was then slowly added to the well stirred reaction mass. The temperature was kept at 30° to 35° C. The reaction to form ethyl mercury chloride started at once as shown by the evolution of heat and by the gradual thickening of the reaction mass. Small lumps of mercuric chloride, coated over with ethyl mercury chloride and lead ethyl chloride, formed. It is necessary that these be all broken up before the reaction will go to completion. After the reaction is complete, the concentrated ethyl mercury chloride may be diluted with any desired diluents to make commercial products.

While, in the above examples, I have disclosed the method of making ethyl mercury chloride and ethyl mercury phosphate, it will be apparent that the method is likewise applicable to the preparation of other ethyl mercury salts, such as ethyl mercury sulfate, ethyl mercury acetate and the like.

From all of the above, it will be apparent that I have provided a method for preparing ethyl mercury salts in equipment containing iron exposed to the reagents in a simple, quick and economical manner without formation of metallic mercury, material corrosion of the iron or objectionable contamination of the desired products with iron. Also, I have provided a method for preparing diluted ethyl mercury salts in condition for use as disinfectants in dust form in an apparatus which is simple and cheap to manufacture and employ. As result, large economies in the manufacture of the ethyl mercury salts are obtained, thereby greatly reducing the cost of such salts.

This is a continuation-in-part of my copending application for "Preparation of ethyl mercury salts," filed October 8, 1937, as Serial Number 167,981.

While I have disclosed the preferred embodiments of my invention and the preferred modes of carrying the same into effect, it will be readily apparent to those skilled in the art that many changes and variations may be made therein without departing from the spirit of my invention. Accordingly, the scope of my invention is not to be limited by specific examples herein given, but I intend to claim my invention as broadly as is possible as in the appended claims.

I claim:

1. In the process of preparing fungicides and seed disinfectants, the steps which comprise providing a solution of tetraethyl lead in a polar solvent in equipment containing iron exposed to the solution, employing at least 20% of the polar solvent based on the mercury, and then introducing a mercury salt into the solution with agitation.

2. In the process of preparing fungicides and seed disinfectants, the steps which comprise providing a solution of tetraethyl lead in a polar solvent in equipment containing iron exposed to the solution, employing at least 20% of the polar solvent based on the mercury, and then introducing a mercury salt into the solution with agitation at a rate such that the temperature is prevented from rising substantially above 40° C.

3. In the process of preparing fungicides and seed disinfectants, the steps which comprise providing a solution of tetraethyl lead in a polar solvent in equipment containing iron exposed to the solution, employing at least 20% of the polar solvent based on the mercury, and then introducing a mercury salt of an inorganic acid into the solution with agitation.

4. In the process of preparing fungicides and seed disinfectants, the steps which comprise providing a solution of tetraethyl lead in ethyl alcohol in equipment containing iron exposed to the solution, employing at least 20% of the ethyl alcohol based on the mercury, and then introducing a mercury salt into the solution with agitation.

5. In the process of preparing fungicides and seed disinfectants, the steps which comprise providing a solution of tetraethyl lead in ethyl alcohol in equipment containing iron exposed to the solution, employing at least 20% of the ethyl alcohol based on the mercury, and then introducing mercuric chloride into the solution with agitation at a rate such that the temperature is prevented from rising substantially above 40° C.

6. In the process of preparing fungicides and seed disinfectants, the steps which comprise providing a solution of tetraethyl lead in a polar solvent in an iron vessel containing iron exposed to the solution, employing amounts of the polar solvent in substantial excess of the amount desired in the final product, and then introducing a mercury salt into the solution with agitation and, when the reaction is complete, removing the solvent by vacuum distillation in the same vessel.

7. In the process of preparing fungicides and seed disinfectants, the steps which comprise providing a solution of tetraethyl lead in ethyl alcohol in an iron vessel containing iron exposed to the solution, employing amounts of the ethyl alcohol in substantial excess of the amounts desired in the final product, and then introducing mercuric chloride into the solution with agitation at a rate such that the temperature is prevented from rising substantially above 40° C. and, when the reaction is complete, removing the excess ethyl alcohol by vacuum distillation in the same vessel.

8. In the process of preparing fungicides and seed disinfectants, the steps which comprise providing a solution of tetraethyl lead in a polar solvent in equipment containing iron exposed to the solution, employing amounts of the polar solvent in substantial excess of the amounts desired in the final product, then introducing a mercury salt into the solution with agitation, then, when the reaction is complete, removing the solvent by vacuum distillation, and adding a solid diluent to the reaction mass at least as soon as the reaction mass begins to become pasty.

9. In the process of preparing fungicides and seed disinfectants, the step which comprises introducing a mercury salt into a mixture of tetraethyl lead and a polar solvent, there being from about 0.2 to about 1.5 parts of solvent to each part of tetraethyl lead and the mercury salt being sufficient to react with up to about 90% of the tetraethyl lead, and causing the reaction between the mercury salt and the tetraethyl lead to take place in the presence of about 0.2 to about 3 parts of a solid diluent to each part of the other ingredients of the reaction mixture.

10. In the process of preparing fungicides and seed disinfectants, the step which comprises introducing a mercury salt of an inorganic acid into a mixture of tetraethyl lead and a polar solvent, there being from about 0.2 to about 1.5 parts of solvent to each part of tetraethyl lead, and the mercury salt being sufficient to react with up to about 90% of the tetraethyl lead, and causing the reaction between the mercury salt and the tetraethyl lead to take place in the presence of about 0.2 to about 3 parts of a solid diluent to each part of the other ingredients of the reaction mixture.

11. In the process of preparing fungicides and seed disinfectants, the step which comprises introducing a mercury salt into a mixture of tetraethyl lead and a polar solvent, there being from about 0.5 to about 0.8 part of solvent to each part of tetraethyl lead and the mercury salt being sufficient to react with up to about 90% of the tetraethyl lead, and causing the reaction between the mercury salt and the tetraethyl lead to take place in the presence of about 0.25 to about 1 part of a solid diluent to each part of the other ingredients of the reaction mixture.

12. In the process of preparing fungicides and seed disinfectants, the step which comprises introducing a mercury salt of an inorganic acid into a mixture of tetraethyl lead and a polar solvent, there being from about 0.5 to about 0.8 part of solvent to each part of tetraethyl lead and the mercury salt being sufficient to react with up to about 90% of the tetraethyl lead, and causing the reaction between the mercury salt and the tetraethyl lead to take place in the presence of about 0.25 to about 1 part of a solid diluent to each part of the other ingredients of the reaction mixture.

LEE C. HOLT.